(12) United States Patent
Lahat et al.

(10) Patent No.: US 6,643,612 B1
(45) Date of Patent: Nov. 4, 2003

(54) MECHANISM AND PROTOCOL FOR PER CONNECTION BASED SERVICE LEVEL AGREEMENT MEASUREMENT

(75) Inventors: Amir Lahat, Kibbutz Givat-Brenner (IL); Ronen Ofek, Tel Aviv (IL); Yoav Kluger, Zichron Yakov (IL); Lior Shabtay, Ganai Tikva (IL)

(73) Assignee: Atrica Ireland Limited, Dublin (IR)

( * ) Notice: Subject to any disclaimer, the term of this patent is extended or adjusted under 35 U.S.C. 154(b) by 14 days.

(21) Appl. No.: 09/894,666

(22) Filed: Jun. 28, 2001

(51) Int. Cl.[7] .................................................. G06F 3/00
(52) U.S. Cl. ...................... 702/186; 702/182; 702/183; 702/184; 702/187
(58) Field of Search .................... 702/128, 176–180, 702/182–184, 186–188; 455/414; 340/531; 709/225; 714/30, 43, 45, 26

(56) References Cited

U.S. PATENT DOCUMENTS

| | | | |
|---|---|---|---|
| 5,450,394 A | 9/1995 | Gruber et al. ................ 370/17 |
| 5,521,907 A | 5/1996 | Ennis, Jr. et al. ............. 370/17 |
| 6,058,102 A | 5/2000 | Drysdale et al. ............ 370/252 |
| 6,363,053 B1 | * 3/2002 | Schuster et al. ............ 370/230 |
| 6,405,364 B1 | * 6/2002 | Bowman-Amuah ......... 717/101 |
| 6,496,850 B1 | * 12/2002 | Bowman-Amuah ......... 709/203 |
| 2001/0034762 A1 | * 10/2001 | Jacobs et al. ............... 709/204 |

* cited by examiner

Primary Examiner—Marc S. Hoff
Assistant Examiner—Felix Suarez
(74) Attorney, Agent, or Firm—Howard Zaretsky

(57) ABSTRACT

A mechanism and associated protocol for performing Service Level Agreement (SLA) measurements in a communications network. The measurements obtained are used to perform various SLA parameter calculations such as delay, round trip delay, one way jitter and bandwidth related calculations. SLA measurement request and response messages are stamped with time and bandwidth counters by the client and remote ends of a connection. The resultant data is used to perform the calculation of SLA parameters.

70 Claims, 7 Drawing Sheets

MECHANISM AND PROTOCOL FOR PER CONNECTION BASED SERVICE LEVEL AGREEMENT MEASUREMENT

FIELD OF THE INVENTION

The present invention relates generally to data communications and more particularly relates to a mechanism and associated protocol for per connection based service level agreement (SLA) parameter measurement.

BACKGROUND OF THE INVENTION

Currently, the number of data networks and the volume of traffic these networks carry are increasing at an ever increasing rate. The network devices making up these networks generally consist of specialized hardware designed to move data at very high speeds. Typical asynchronous packet based networks, such as Ethernet or MPLS based networks, are mainly comprised of end stations, hubs, switches, routers, bridges and gateways. A network management system (NMS) is typically employed to provision, administer and maintain the network. One of the basic features of an NMS is the network level reporting that is available to assist the network administrator in managing the network. The network level reports provide a large amount of data about the network and the general view of the network enables the network manager to identify problems or faulty behavior in the network. Once a particular area of interest in the network is identified, a more in depth view can be obtained by specific reports on a device, link or connection basis.

The devices deployed in networks that have management capability commonly use the simple network management protocol (SNMP) via an SNMP agent built into the device. The NMS communicates with each network device in the network via the SNMP agent. The NMS can collect reporting data and write configuration data into the device via the agents. The network device provides access to internal data via what is known as a management information base (MIB). Standard MIBs are universally defined while proprietary MIBs are valid only for a specific vendor's products.

From a user's perspective, the information to be collected for a network switch device generally include packet throughput, latency, traffic load, jitter, round trip delay, bandwidth availability, the number of valid and lost packets, etc. For example: total packets including valid and erroneous packets; packets discarded due to CRC error, oversize packet, undersize, etc.; packets discarded due to overload conditions; error rate, i.e. percentage of error packets out of total packets, discard rate, i.e. percentage of discarded packets out of valid packets. In addition, the data collected may be on a link basis, port basis or connection basis for either inbound or outbound traffic.

A service level agreement (SLA) is a contract between a service provider and a user (i.e. customer) whereby the user pays to receive a certain quality of service. Often the service provider agrees to provide the user a minimum bandwidth referred to as the committed information rate (CIR). The bandwidth may be higher during bursts and the service provider agrees to provide an expected information rate (EIR) which is higher than the CIR. User packets received that exceed the EIR may be dropped. User's rely heavily on network reporting to verify that the rate provided by the service provider is in accordance with the service level agreement. The reporting capabilities of the network provide the user with the means to insure the rates promised by the SLA. If packets are dropped, even though the rate reported is below the CIR in the SLA, appropriate troubleshooting measures can then be taken.

As the number of devices in the network grows, the amount of processing resources needed to carry out the reporting also increases. If the number of connections/ports/links that need reporting grows too large, network performance may suffer noticeably.

Thus, there is a need for a mechanism capable of providing SLA reporting that provides the necessary reporting capabilities and that is scaleable over a large number of connections without placing an undue burden on the processing resources of the devices in the network.

SUMMARY OF THE INVENTION

The present invention provides a mechanism and associated protocol for performing SLA measurements in a communications network. The measurements may be performed on any desired basis such as device, link or connection basis. The measurements obtained are used to perform various SLA parameter calculations such as end to end delay, round trip delay, one way jitter and bandwidth calculations.

To provide SLA measurement capability, the invention is incorporated into the network devices within the network. For example, the invention may be incorporated in access devices or the switches making up the core network. Round trip delay and bandwidth measurements are performed using the mechanism of the present invention on both ends of a connection. One mechanism on one side sends SLA measurement request messages and the mechanism on the other side responds to these messages.

The SLA measurement messages are recognized by the hardware, time stamped and bandwidth stamped and sent back in a reply message without the intervention of software running on the CPU of the server (i.e. destination) side. This permits the measurement mechanism to scale to large numbers of connections monitored. An advantage of the SLA measurement protocol is the ability to scale to perform measurements over a large number of connections within an iteration period The mechanism also permits shortening of the iteration period for specific connections when required Specifically, a single-second iteration is possible in the case of a single connection per box.

In addition, it is possible to perform multiple measurement processes per connection, for example, one measurement process for a constant low frequency check and another measurement process for a temporary high frequency check. The measurement of the round trip delay and jitter is from the network port of an access device to the network port of another access device.

The mechanism of the present invention comprises hardware based bandwidth counters that function to accurately measure various packet flows including sent, received and lost packets in synchronous fashion such that a user can know exactly how many packets sent on one side of a connection were received on the other side. Bandwidth counters are measured within a short period of time so that the user can verify CIR and EIR rates.

There is thus provided in accordance with the present invention a method in a network for performing service level agreement (SLA) measurements, the method comprising the steps of determining a plurality of connections to be measured; and for each connection to be measured, generating at a local device a local ingress stamp and transmitting over the connection to a remote device an SLA measurement request message incorporating the local ingress stamp, generating a remote egress stamp at the remote device and transmitting over the connection to the local device an SLA measurement response message incorporating the remote egress stamp and the local ingress stamp, generating a local egress stamp upon receipt by the local device of the SLA measurement response message and calculating one or more SLA parameter measurements in accordance with the local ingress stamp, the remote egress stamp and the local egress stamp.

There is also provided in accordance with the present invention a method in a network device for performing service level agreement (SLA) measurements, the method comprising the steps of determining a plurality of connections to be measured; and for each connection to be measured, generating a client ingress stamp and transmitting an SLA measurement request message incorporating the local ingress stamp over a communications network to a remote device for generating a server egress stamp and responding therewith, receiving an SLA measurement response message incorporating the server egress stamp and generating a client egress stamp in response thereto and calculating one or more SLA parameter measurements in accordance with the client ingress stamp, the server egress stamp and the client egress stamp.

There is further provided in accordance with the present invention a method in a network device for performing service level agreement (SLA) measurements, the method comprising the steps of receiving over a communications network an SLA measurement request message incorporating a client ingress stamp from a client device and generating a server egress stamp and transmitting an SLA measurement response message incorporating the remote egress stamp and the client ingress stamp over the communications network to the client device for generating a client egress stamp and calculating one or more SLA parameter measurements in accordance with the client ingress stamp, the server egress stamp and the client egress stamp.

There is still further provided in accordance with the present invention a network device comprising a control processor, one or more user ports, one or more network ports, ingress packet processing means adapted to recognize service level agreement (SLA) measurement request. messages generated for connections and to generate client ingress stamps in response thereto, transmission means adapted to transmit the SLA measurement request messages over a communications network to a remote device at a far end of the connection for replying with a server egress stamp within an SLA measurement response message, egress packet processing means adapted to recognize the SLA measurement response message and to generate a client egress stamp, means for forwarding the client ingress stamp, server egress stamp, the client egress stamp, connection-ID and iterator to the control processor and software operative on the control processor for calculating one or more SLA measurement parameters in accordance with the client ingress stamp, server egress stamp and the client egress stamp.

There is also provided in accordance with the present invention a protocol for use in performing service level agreement (SLA) measurements in a network, comprising messages wherein each message comprises a first field in an SLA measurement message representing a particular connection to be measured, a second field in an SLA measurement message representing a client ingress stamp, a third field in an SLA measurement message representing a server egress stamp and a fourth field in an SLA measurement message representing a client egress stamp.

There is further provided in accordance with the present invention a computer program product for use in a network device, the computer program product comprising a computer useable medium having computer readable program code means embodied in the medium for performing service level agreement (SLA) measurements, the computer program product comprising computer readable program code means for determining a plurality of connections to be measured, computer readable program code means for generating, for each connection to be measured, a client ingress stamp and transmitting an SLA measurement request message incorporating the local ingress stamp over a communications network to a remote device for responding with an server egress stamp, computer readable program code means for receiving an SLA measurement response message incorporating the server egress stamp and generating a client egress stamp in response thereto and computer readable program code means for calculating one or more SLA parameter measurements in accordance with the client ingress stamp, the server egress stamp and the client egress stamp.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ASIC | Application Specific Integrated Circuit |
| ASP | Application Service Provider |
| CIR | Committed Information Rate |
| CPU | Central Processing Unit |
| CRC | Cyclic Redundancy Check |
| DA | Destination Address |
| EIR | Expected Information Rate |
| EPROM | Erasable Programmable Read Only Memory |
| FE | Fast Ethernet |
| FPGA | Field Programmable Gate Array |
| GE | Gigabit Ethernet |
| IP | Internet Protocol |
| ISO | International Standards Organization |

-continued

| Term | Definition |
| --- | --- |
| ISP | Internet Service Provider |
| LLC | Logical Link Control |
| MAC | Media Access Control |
| MAN | Metropolitan Area Network |
| MPLS | Multi-Protocol Label Switching |
| MIB | Management Information Base |
| NMS | Network Management System |
| OSI | Open Systems Interconnect |
| OUI | Organizationally Unique Identifier |
| PDU | Protocol Data Units |
| RAM | Random Access Memory |
| RTP | Real Time Protocol |
| SA | Source Address |
| SLA | Service Level Agreement |
| SNAP | Sub-Network Access Protocol |
| SNMP | Simple Network Management Protocol |
| TCP | Transmission Control Protocol |
| TDM | Time Division Multiplexing |
| UDP | User Datagram Protocol |
| VLAN | Virtual Local Area Network |

The present invention provides a mechanism and associated protocol for service level agreement (SLA) measurement on a per connection or other basis. In one example embodiment of the invention, a mechanism and protocol is described for performing round trip delay, jitter and bandwidth measurements. The invention may be used to provide other types of measurements as well without departing from the scope of the invention.

To provide SLA measurement capability, the invention is incorporated into the network devices within the network. Round trip delay and bandwidth measurements are performed using the mechanism of the present invention on both ends of a connection. One mechanism sends SLA measurement request messages and the other responds to these messages.

Figure 1:
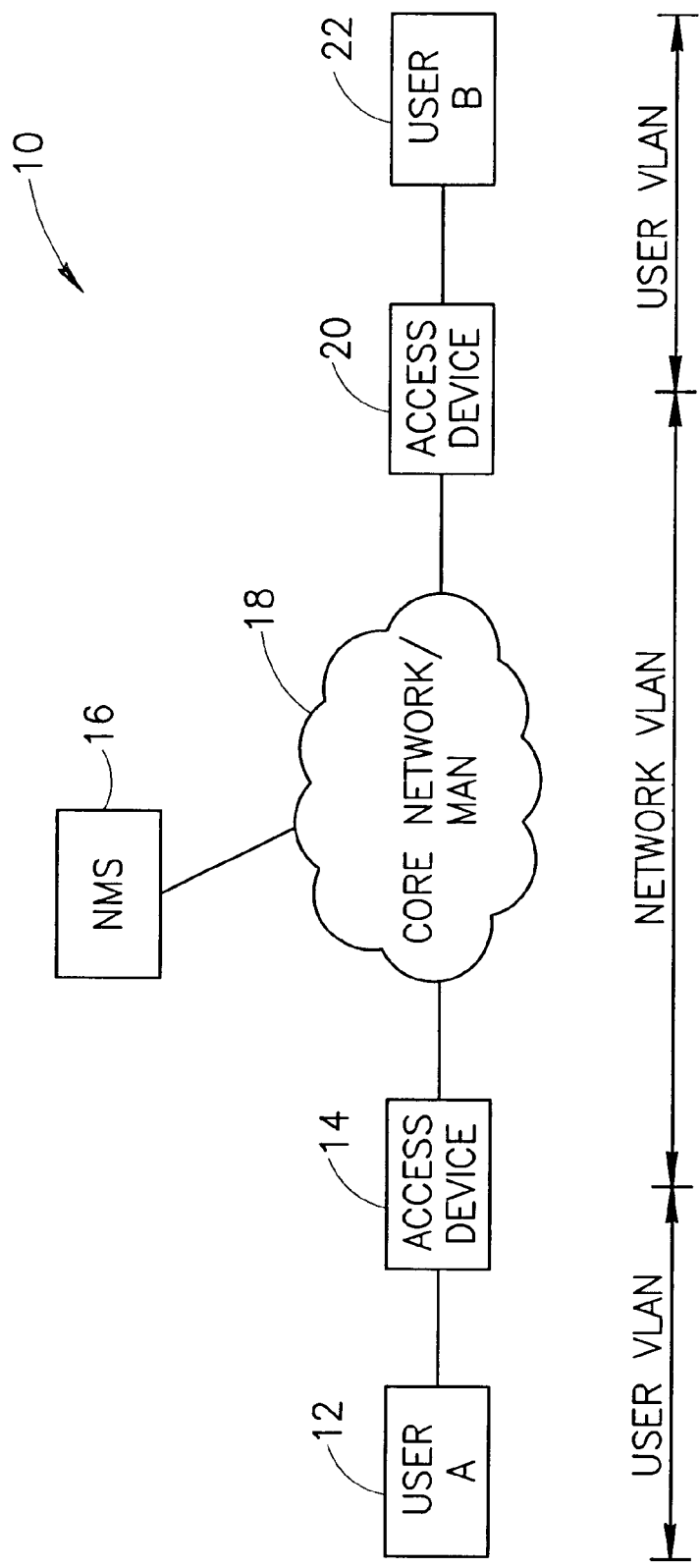
FIG. 1 is a block diagram illustrating an example network including users, access devices, MAN and NMS.

A block diagram illustrating an example network including users, access devices, MAN and NMS is shown in FIG. 1. The network, generally referenced 10, comprises a core network 18 which may be a metropolitan area network (MAN), a plurality of access devices, users and a network management system (NMS) 16. In this example, two users, users A 12 and B 22 are shown connected to access devices 14, 20, respectively. The end users in the network may be businesses, home users, Internet service providers (ISPs), application service providers (ASPs), long haul transmission providers, etc. The access device is typically located in the customer premises or close to it in a gateway location.

Users are connected to the MAN via the access devices that are positioned on the edge of the MAN. The access devices function to establish the connections between users. The connections are established using VLANs as in the case when the MAN is implemented as an 802.1 Q Ethernet network. The end-to-end connection comprises user and network portions including a user VLAN portion between the user and the access device on either end and a network VLAN connecting the two user VLANs.

It is important to note that the invention is not limited to the type of network technology used. The invention is suitable for implementation with any synchronous packet based network technology such as Ethernet, MPLS, etc.

The NMS functions to initiate the SLA measurement process. The process is adapted to perform measurements including round-trip delay, jitter and bandwidth measurements over a connection by instructing the access device on one end of the connection to perform the measurement process. The access device then starts a periodic process of measuring the round-trip delay, etc.

During each iteration of the measurement process, the access device transmits an SLA-measurement request message to the access device on the other end of the connection. The access device on the remote side responds with an SLA measurement response message. The two access devices stamp the timing of transmission and reception of the messages as well as values of octet reception and transmission counters of the connection. The stamped information is used to compute various SLA measurement parameters, such as round trip delay, jitter and bandwidth related parameters such as bandwidth usage, dropped octets number and dropped octets rate.

Each access device maintains, on a per-connection basis, several parameters including the average of the measured round-trip delay, jitter and bandwidth-characteristics. A protocol adapted to be used with the SLA measurement mechanism is described. The protocol is designed such that the SLA measurement process does not overload the processor (i.e. CPU) of the access device.

Note that before the measurement process begins, the clock rates of the access devices on either end of the connection exchange messages (i.e. clock rate messages). The purpose of the clock rate messages is to inform the access device on one side of a connection about the rate of the clock used to timestamp messages at the access device on the remote side of the connection.

For illustration purposes, the principles of the present invention are described in the context of an access device adapted to implement the SLA measurement mechanism and protocol of the present invention. The example network presented above illustrates two users connected to access devices located on the edge of the core MAN. It is not intended, however, that the invention be limited to the configurations and embodiments described herein. It is appreciated that one skilled in the electrical and/or networking arts may apply the principles of the present invention to numerous other types of networking devices and network configurations as well without departing from the spirit and scope of the invention.

Note that in this document, the references made to various frame/packet formats such as Ethernet frames, IP packets, RTP packets, UDP packets, etc. are intended as examples of general protocol data units (PDUs). Particular PDUs are associated with various networks such as Ethernet, H.323, ISO OSI TCP/IP protocol stack. It is appreciated, however, that the invention may be adapted for use in other types of networks that transmit other types of PDUs as well.

Figure 2:
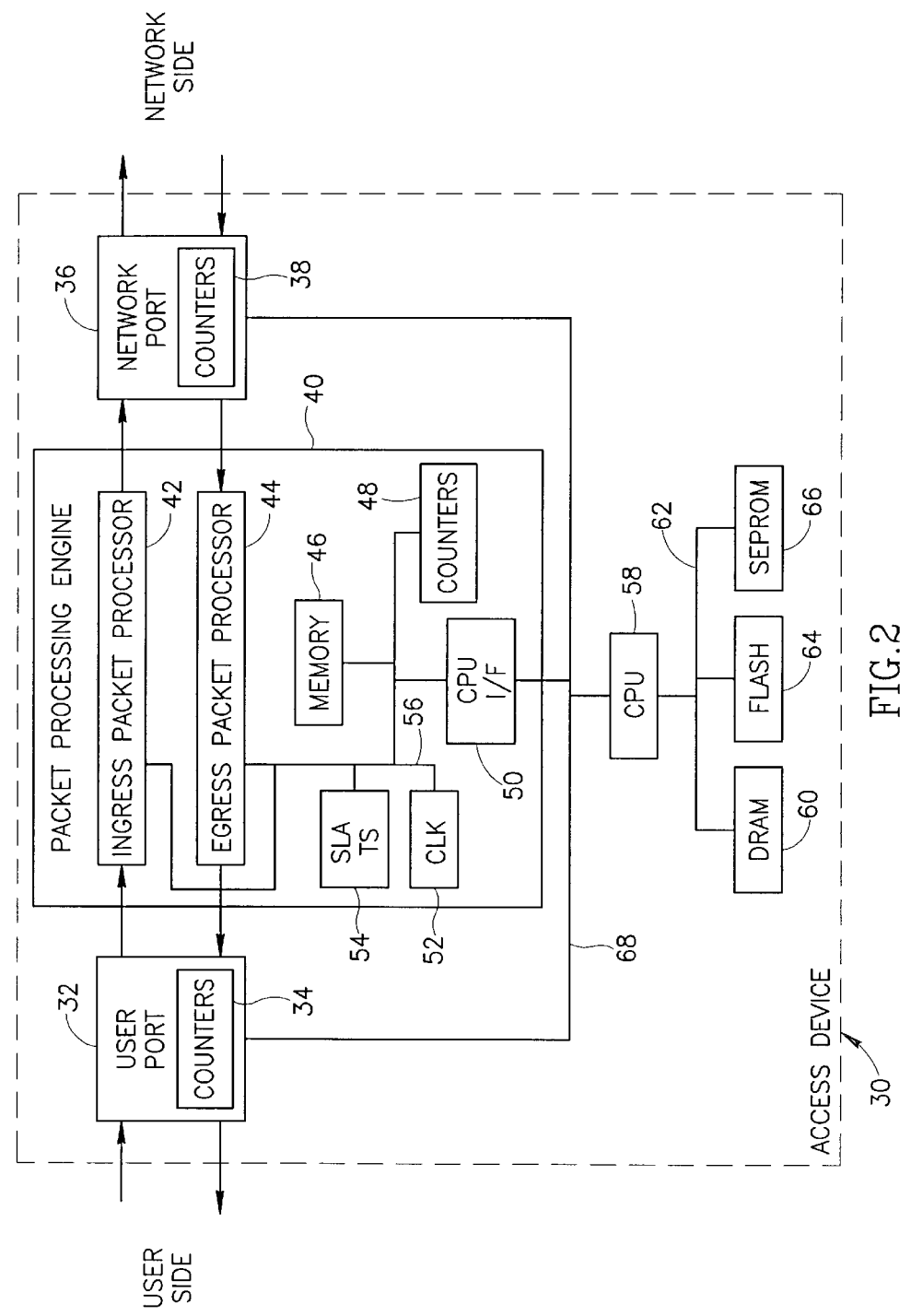
FIG. 2 is a block diagram illustrating an example embodiment of an access device constructed in accordance with the present invention.

A block diagram illustrating an example embodiment of an access device constructed in accordance with the present invention is shown in FIG. 2. The access device, generally referenced 30, comprises at its core a packet processing engine 40, one or more user ports 32 and one or more network ports 36, a central processor 58, e.g., CPU, and both volatile and non-volatile memory including RAM memory 60 for storing data and application program code, Flash memory 64 for storing boot and application code and serial EPROM 66 for storing configuration data. The CPU communicates to the memory peripherals and other support devices via a CPU bus 62.

The access device comprises a user side and a network side. The user side interfaces to the user via any suitable type of interface, e.g., Gigabit Ethernet (GE), Fast Ethernet (FE), etc. Likewise, the network side interfaces to the core network via any suitable interface such as Gigabit Ethernet, TDM, etc. The user ports comprise one or more counters 34 adapted to count ingress packets, egress packets and octets that flow through the user port. Similarly, the network ports comprise one or more counters 38 adapted to count ingress, egress packets and octets that flow through the network port. Note that a user port may initiate a number of connections.

The packet processing engine comprises an ingress packet processor 42, egress packet processor 44, SLA timestamp circuit 54, clock circuit 52, memory 46, one or more counters 48 and a CPU interface 50. The various modules and circuits communicate with each other within the packet processing engine via an internal bus 56. Note that the plurality of counters are maintained, one for each connection to be monitored. Specifically, ingress and egress packets and octets are counted per connection, with separate counters for traffic that is below CIR, for traffic that is between CIR and EIR, for dropped packets and octets that are below CIR, between CIR and EIR, and for dropped traffic that is above EIR. Note also that the counters 48, SLA timestamp circuit 54 and clock circuit 52 may be implemented within the ingress and egress packet processors but are shown here separate for better clarity.

In accordance with the present invention, a portion of the SLA measurement mechanism and protocol is preferably implemented in hardware circuitry within the packet processing engine. In order to be able to scale to any desired number of connections to be measured and to achieve maximum accuracy, the packet processing engine comprises a hardware capability of identifying the SLA measurement messages and inserting the SLA measurement data (e.g., timestamps, etc.) into the messages at a specific offset within the message in accordance with the SLA measurement cycle process.

On the ingress side when transmitting packets toward the network, the packet processing engine is adapted to stamp the packet with a timestamp, ingress forwarded octets and ingress forwarded marked octets.

A timestamp is a value read by the packet processing engine from a hardware based clock when processing the received message. The clock is preferably a hardware based 32-bit counter with a resolution of at least one microsecond. The timestamp is preferably taken before the packet queues on ingress. Ingress forwarded octets is the value of a counter adapted to count the number of 'valid forwarded octets' for the connection, which is the counter that counts the ingress octets that are received and are regarded as CIR traffic. Ingress forwarded marked octets is the value of a counter adapted to count the number of 'ingress forwarded octets' of marked packets for the connection (i.e. the counter counts the EIR traffic that was forwarded towards the network).

On the egress side when receiving packets from the network, the packet processing engine is adapted to timestamp the packet with the following parameters: timestamp, egress forwarded octets and egress forwarded and marked octets. The timestamp is a 32-bit value read by the packet processing engine from a hardware based clock when processing the received message. Preferably, the timestamp is taken after the packets queue on egress. Egress forwarded octets is the value of the egress 'valid forwarded octets' counter for the connection, which is the counter that counts the number of egress forwarded octets that are regarded as CIR traffic. Egress forwarded marked octets is the value of the egress 'forwarded marked octets of marked packets' counter for the connection. This counter counts the EIR traffic that was received from the network and forwarded towards the user.

Figure 3:
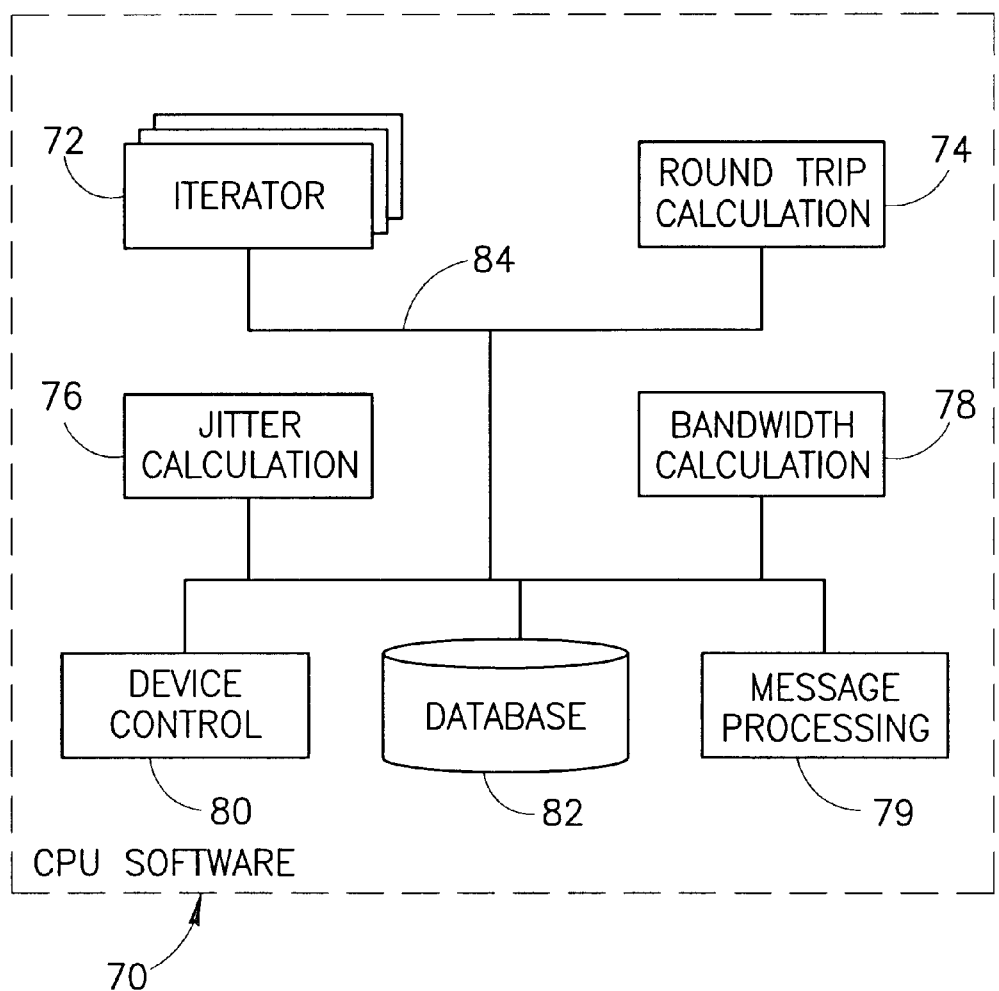
FIG. 3 is a block diagram illustrating a portion of the CPU software architecture of the present invention.

A block diagram illustrating a portion of the CPU software architecture of the present invention is shown in FIG. 3. In accordance with the invention, a portion of the SLA measurement mechanism comprises software adapted to execute on the CPU. The software is divided into a plurality of tasks that communicate with one another via inter-process communications. Depending on tho implementation, an operating system may be installed that has built-in support for one or more types of inter-process communications such as messaging, semaphore, flags, etc.

The tasks shown here do not necessarily comprise all the tasks required for the operation of the. access device. Only the tasks related to implementing the invention are shown for clarity sake. The tasks comprise a device control task 80 that includes the software necessary to operate and control the packet processing functions of the access device, one or more iterator routines 72 for performing the iterator function, a database 82 and related routines for reading, writing and deleting records in the database and a message processing routine 79. The database is used to store SLA measurement related data. The software also comprises routines for calculating a plurality of SLA measurement parameters. In this example, the routines comprise a round trip calculation routine 74, jitter calculation routine 76 and bandwidth calculation routine 78. In addition, the software also comprises one or more low level hardware drivers, a suitable operating system such as VxWorks and the application layer software.

Alternatively, a send packets task is operative to implement the iterator tasks including generating and transmitting SLA related packets. Similarly, a receive packets task is operative to receive and process packets. The various SLA calculations are performed via various tasks that are called from the receive packet task.

A management task performs configuration management whereby changes, additions and deletions of components, interfaces, etc. as well as dynamic updating of the configuration are handled. In addition, the management task performs accounting functions on its ports and user connections including the user and network ports in order to provide statistics, data analysis, information for debug and proper analysis of the network. Other functions include providing performance parameters such as ingress and egress delays, Ethernet utilization, end to end delay, jitter parameters, etc.

In order to enable an administrator to be able to set periodic SLA measurement cycles for connections, the present invention comprises one or more iterators. An iterator is adapted to trigger and process SLA measurements on a periodic basis for a plurality of connections. The iterator is adapted to insure that the measurement cycles for different connections do not happen at the same time so that (1) the SLA-measurement protocol does not overload the CPU of the access device and (2) the SLA measurements performed are accurate, since the receipt of too many SLA measurement packets at the same time is likely to cause delay among some of the packets resulting in inaccurate results. Thus, the access device is adapted to limit the number of SLA measurement request messages transmitted per second. In the example embodiment presented herein, the maximum number of SLA measurement request messages that can be transmitted in one second is limited to four.

The access device may implement any number of iterators. Each iterator defines a different period of iteration time. Each connection registers to one or more of the iterators and is polled in the corresponding period intervals. Each iterator is set to a particular iteration period in seconds. The number of connections registered to an iterator is limited to the number of connections that can be handled within the period of that particular iterator. The transmission rate of all iterators must not exceed the maximum number of SLA measurement request messages permitted per second. In the example presented herein, the number of request messages is limited to four. Thus, each iterator is permitted to send up to two SLA measurement request messages each second. This ensures that the SLA measurement access device client does not send more than four messages per second. Note that the invention may be constructed having any desired number of iterators depending on the particular implementation and requirements of the network.

A list of connections to be measured is determined for each iterator. The software comprises means for adding and removing connections from an iterator list without the need to stop the iterator from doing its work. Each iterator is adapted to perform the following during each measurement cycle. Send an SLA measurement request message for the next connection in the list (if any). Send an SLA measurement request message for the connection that was polled during the previous iteration. Thus, two consecutive request messages are transmitted for each connection in the list.

The reason for sending consecutive request messages is that several of the SLA measurement calculations, such as jitter and bandwidth, are performed using two consecutive measurements taken one second (as an example) from each other. This is required for the Jitter calculation, for example, since the connection may not be measured again until a relatively long time from now, e.g., a few minutes or even a few hours. The jitter over such long periods of time is of less interest. It is desirable to measure changes in jitter while an application is running.

The same requirement applies for the bandwidth calculations. In the case where the hardware octet counters are 32-bits wide, the counter may reset before the next SLA measurement if the connection is not measured within approximately 10 seconds (for 1 Gigbit traffic). In addition, it is preferable to measure bandwidth counters across a short period of time to help the user verify EIR and CIR rates.

In addition, the mechanism is adapted such that transmission of SLA measurement request messages and the receipt of corresponding response messages occurs asynchronously. This ensures that the transmission of the next request message is not delayed until the current pending request is answered.

As an example, consider an access device with two iterators. Iterator 1 is configured to have an iteration interval of 1 hour and poll 2000 connections once during that hour.

Iterator 2 is configured to have an iteration interval of 1 second and poll a single connection that is to be the temporary focus of attention.

In accordance with the invention, the packet processing engine and any or all of the software routines in part or in whole may be implemented in one or more Application Specific Integrated Circuit (ASIC) devices, Field Programmable Gate Array (FPGA) devices or network processors.

Figure 4:
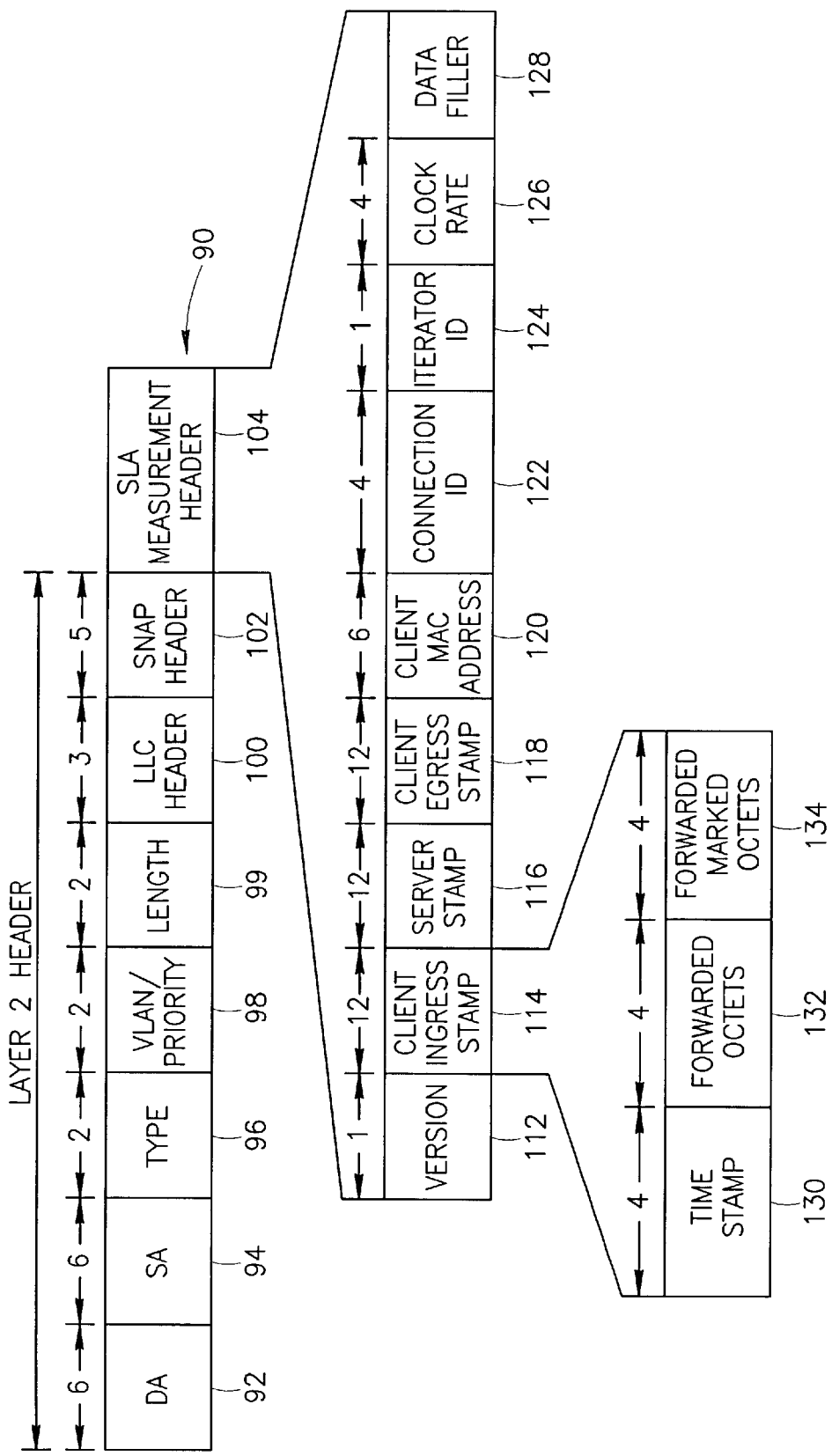
FIG. 4 is a diagram illustrating an example protocol adapted to perform SLA measurements in a communications network.

The protocol and frame format used in the SLA measurement process will now be described in more detail. A diagram illustrating an example protocol adapted to perform SLA measurements in a communications network is shown in FIG. 4. The protocol frame format, generally referenced 90, is used on the network side of the access device between access devices and is conveyed through the core MAN.

The SLA measurement protocol header follows the layer-2 header. The layer-2 header comprises an Ethernet layer-2 header, a LLC header, and a SNAP header. Note that the one or more headers transmitted before the SLA-measurements protocol header may differ according to the specific technology used. In the example presented herein, an Ethernet header together with LLC and SNAP headers are used. The layer 2 header comprises a destination address (DA) 92, source address (SA) 94, type field 96 (set to 0×8100), 2-byte VLAN tag/priority field 98, 2-byte length field 99, 3-byte LLC header field 100 and 5-byte SNAP header field 102. In accordance with the invention, the DA comprises a well known MAC address for indicating SLA measurement request messages or response messages. The SA comprises the MAC of the network port of the access device. The VLAN/priority field comprises 12 bits of VLAN-ID for the specific VLAN path over which the packet is transmitted and a three bit priority. There is a one to one correspondence between the VLAN-ID and the specific connection to be measured. The length field comprises the length of the frame starting after the length field and not including the CRC.

The LLC header 100 is adapted to indicate that the next header is a SNAP header. The SNAP header 102 comprises five bytes wherein the first three are the particular OUI and the last two indicate that the next header is an SLA measurement protocol header.

The SLA measurement header comprises the following fields. A version field 112 indicating the version of the protocol. A client ingress stamp field 114 which is time stamped by the ingress packet processor of the client (or local) access device upon transmission of the SLA measurement request message. A server stamp field 116 which is time stamped by the egress packet processor of the server (or remote) access device upon receipt of the SLA measurement request message. A client egress stamp field 118 which is time stamped by the egress packet processor of the client (or local) access device upon receipt of the SLA measurement response message.

A client MAC address field 120 is used for multipoint to multipoint connections. Clients insert their own MAC address into this field in SLA measurement messages in order to ensure that the packet is forwarded to The CPU in the client device only and not to CPUs in other devices that are members of the multipoint to multipoint connection. In an SLA measurement clock rate message, this field is set to the broadcast address to ensure that the CPU of the access device on the remote side receives the message. The hardware is adapted to examine this field when deciding whether to forward the packet to the CPU. The packet-processing engine forwards the packet to the CPU only if the client MAC address is the MAC address of the particular access device or a multicast or broadcast MAC address. In clock rate synchronization messages, the software sets this field to the broadcast MAC address, indicating that it should be forwarded to the CPU of the receiving side in any case.

A connection ID field 122 comprises an identification of the connection that is being measured by the message. An iteratorID field 124 functions to identify the particular iterator that issued the request message. This field is used to distinguish between iterators in the case where more than one iterator is used for the same connection, each iterator having a different iteration period duration A clock rate field 126 comprising the rate of the clock of the access device that is sending the message. A data filler field 128 comprising zeros having a length in accordance with instructions given to the access device. This field is set via command and is used to specify the length of the SLA measurement packet. The length of the packet can be varied to determine whether packet length effects the SLA measurements.

The format of each stamp, including client ingress, server egress and client egress stamps, is as shown for the client ingress stamp. The format comprises a 32-bit timestamp 130, 32-bit forwarded octets 132 and 32-bit forwarded marked octets 134.

Figure 5:
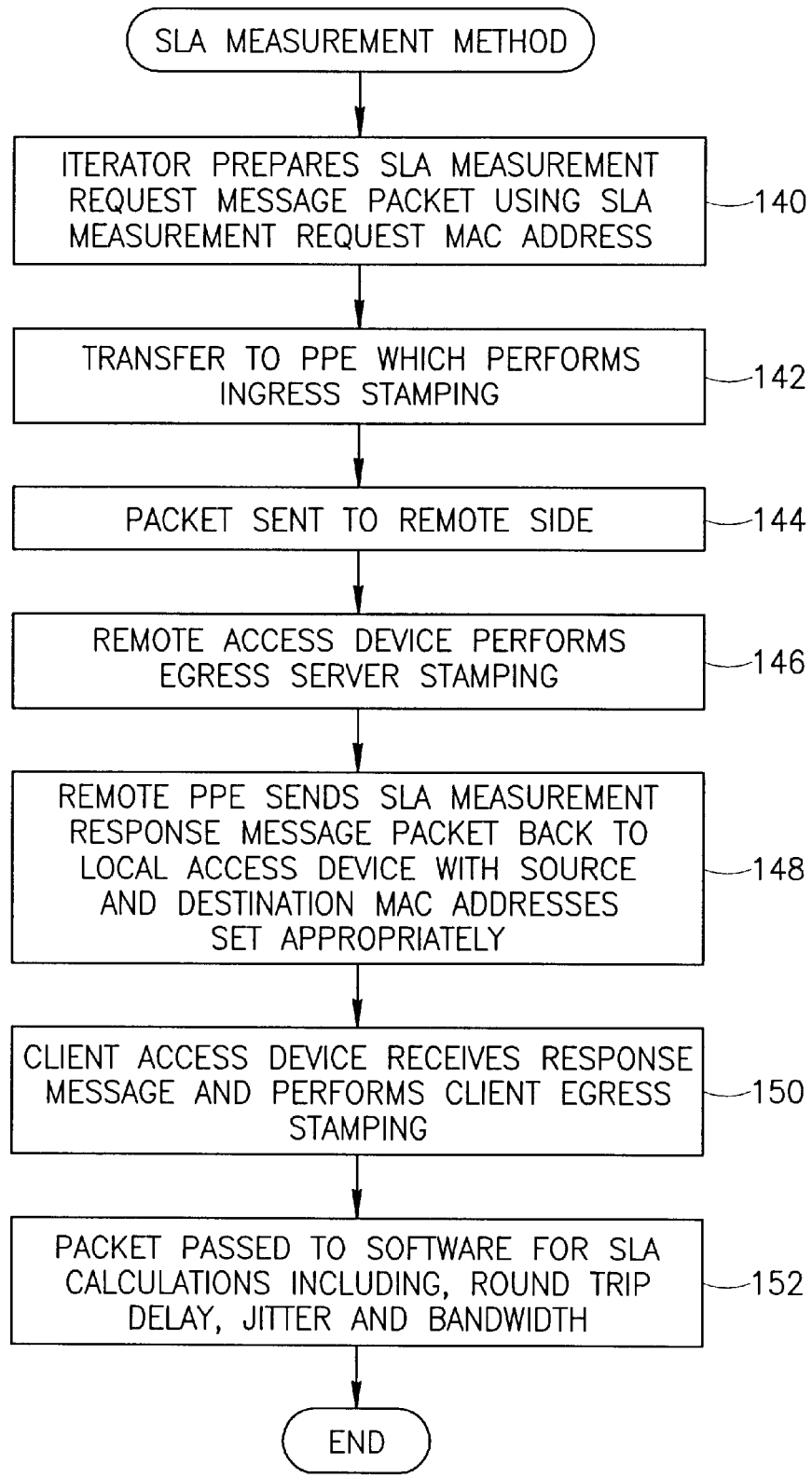
FIG. 5 is a flow diagram illustrating the SLA measurement method of the present invention.

The SLA-measurement cycle process will now be described in more detail. A flow diagram illustrating the SLA measurement method of the present invention is shown in FIG. 5. An SLA measurement request message is prepared by the SLA measurement client iteration task in the client access device. The destination MAC address of the packet is set to the special SLA measurement request message MAC address (step 140). Using a suitable driver, the iterator task transfers the packet over to the ingress packet processor for client ingress time stamping (step 142). Before transmission of the packet, the ingress packet processor performs ingress SLA measurement stamping of the packet and inserts the client ingress stamp into the client ingress stamp field in the packet. The ingress packet processor then sends the packet through the connection to be measured to the access device on the remote side (step 144).

The packet is transmitted to the remote end access device. The remote end access device performs egress SLA measurement stamping on the packet immediately upon receipt of the packet by the egress packet processor and inserts the egress stamp into the server egress stamp field in the packet (step 146). The packet now comprises two valid stamps: the client ingress stamp inserted by the client access device and the server egress stamp inserted by the remote access device.

The packet processing engine on the remote end changes the packet into a SLA measurement response message for reply to the client access device (step 148). The value of the destination MAC address is changed from that of the SLA measurement request to that of SLA measurement response. In addition, the packet processing engine in the remote access device changes the value of the source MAC-address to the MAC-address of the interface through which it sends the response packet.

Upon receipt of the response message by the egress packet processor in the client access device, a client egress stamp is generated and inserted into the packet in the client egress stamp field (step 150). The packet is then transferred to one or more CPU software tasks for SLA parameter measurement calculations such as round trip delay, jitter and bandwidth calculations (step 152).

The clock rate information exchange method will now be described in more detail. As described above, the SLA measurement protocol is performed between different access devices. It may be the case that the hardware in different access devices use clocks with different rates for time stamping the SLA measurement messages. This requires the client access device to translate the timestamps to a common clock rate before using them. The client side preferably has the clock rate value of the server (i.e. remote) side in order to perform calculations such as one-way jitter. The following protocol is defined to implement this.

Figure 6:
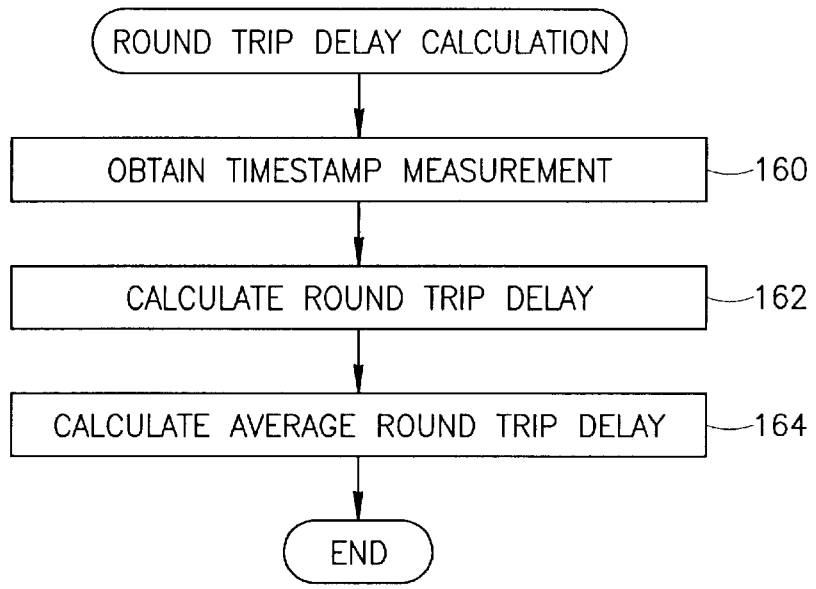
FIG. 6 is a flow diagram illustrating the round trip delay calculation method of the present invention.

For each connection that is to be measured, the client access device maintains a variable named 'other-side-rate' which is initialized to zero. The 'other-side-rate' variable contains the number of ticks per second of the remote clock When an SLA measurement cycle is to be performed and the 'other-side-rate' equals zero. the client access device sends the SLA measurement request message. Immediately afterwards, it sends an SLA measurement clock rate request message. This message reaches the CPU of the remote side which will respond with a measurement clock rate response message. If a response is not received, the client access device does not perform jitter calculations. Note that in any case two measurements are needed for the jitter calculation, If a response is received, the remote clock rate data is used to translate the timestamps to a common clock The method of round trip delay calculation will now be described in more detail. A flow diagram illustrating the round trip delay calculation method of the present invention is shown in FIG. 6. First, the timestamp measurement is obtained (step 160). The round trip delay (step 162) and average round trip delay (step 164) are calculated in accordance herewith.

Upon receiving an SLA measurement response packet, the message processing task in combination with the round trip delay calculation routine in the client access device computes the round-trip delay in accordance with Equation 1 below.

$$\text{round\_trip\_delay} = \text{client\_egress\_timestamp} - \text{client\_ingress\_timestamp} \quad (1)$$

The client ingress stamp is the timestamp stamped by the client access device upon sending the SLA measurement request message to the remote side. The client egress stamp is the timestamp generated by the client access device upon receiving the SLA measurement response message from the remote access device.

For each connection polled by each iterator, the client access device maintains a MIB item holding the average of the round trip delay measurements. Normally averages are calculated as an average of a number of specific measurements (e.g., an average of the last M measurements). This requires holding an array containing the last M measurements and managing it properly. Instead, the mechanism of the present invention requires only one variable, i.e. the average calculated until now. In addition, the mechanism calculates a weighted average wherein recent measurements have a greater effect on the calculated average.

The calculation is of a 'weighted-average' type wherein a weight of $1/N$ is assigned to the last measurement and a weight of $(N-1)/N$ is assigned to the previously calculated average in a recursive fashion. The quantity N is a number provided by an external system such as the NMS and by default it is equal to one.

In operation, the software maintains a variable n that holds the number of polls previously performed per connection per iterator. Each measurement cycle, n is incremented until it reaches N whereupon it remains at N from then on. An additional variable average maintains the average round trip value calculated until this point.

Upon calculating a new round_trip_delay, n is incremented accordingly and a new average value is calculated as follows.

$$\text{average} = \text{average} \cdot \frac{n-1}{n} + \text{round\_trip\_delay} \cdot \frac{1}{n} \quad (2)$$

The counter n is used to count the measurements in order to insure that before making n<N measurements, each measurement has the same impact on the calculated average. After reaching N, the last measurement has a 1/N impact on the calculated average regardless of the number of measurements previously taken.

In the case where the results are to be presented to the user in microseconds, the accuracy of the average and measurement values should preferably be higher. For example, the accuracy may be related to the clock used by the hardware.

Before the average value is provided to the user, it is normalized accordingly.

Figure 7:
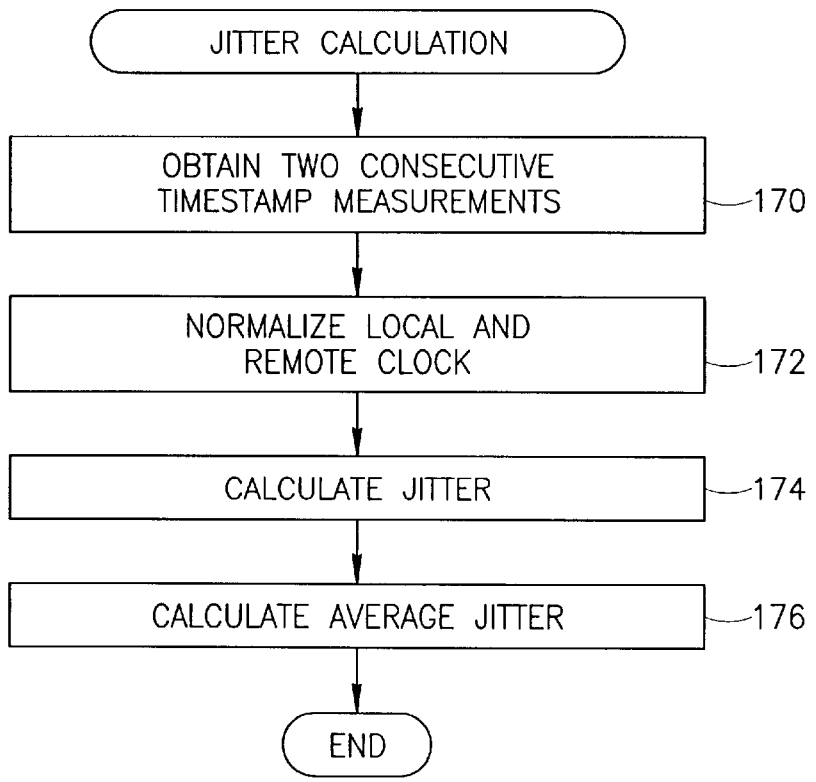
FIG. 7 is a flow diagram illustrating the jitter calculation method of the present invention.

The method of jitter calculation will now be described in more detail. A flow diagram illustrating the jitter calculation method of the present invention is shown in FIG. 7. In the example embodiment of the present invention, jitter calculations are performed according to two consecutive SLA measurements made a short time period from each other, e.g., one second. Before performing the calculations, the measurements of the local and remote clock are preferably normalized to a 1-microsecond rate. This is performed using the local and remote clock rate values, as obtained by the clock rate information exchange method described hereinabove. The following description assumes that the clock rate values are normalized.

First, two consecutive timestamp measurements are obtained (step 170). The local and remote clocks are normalized (step 172) and the jitter (step 174) and average jitter (step 176) are calculated in accordance herewith. The jitter is calculated in accordance with the following.

$$\text{jitter} = |(svr\_egress\_ts_2 - client\_ingress\_ts_2) - (svr\_egress\_ts_1 - client\_ingress\_ts_1)| \quad (3)$$

The client_ingress_ts is the timestamp generated by the client access device upon transmission of the SLA measurement request message. The svr_egress_ts is the timestamp generated by the server access device on the remote side in response to receiving the SLA measurement request message.

For each connection polled by each iterator, the client access device maintains a MIB item holding the average of the jitter measurement. The calculation is of a 'weighted-average' type that applies a weight of 1/Nj to the last measurement and a weight of (Nj−1)/Nj to the previously calculated average in recursive fashion. The quantity Nj is a number provided by an external source such as the NMS.

In operation, the access device maintains a variable n holding the number of polls already performed per connection per iterator. When the value of n reaches Nj it remains equal to Nj from then on. An additional variable jitter_average maintains the average jitter value calculated until the present. Upon calculating a new jitter value, n is incremented and then a new average jitter value is calculated as follows.

$$\text{jitter\_average} = \text{jitter\_average} \cdot \frac{n-1}{n} + \text{jitter} \cdot \frac{1}{n} \quad (4)$$

Note that the calculations for jitter and jitter_average are similar to those defined in RFC 1889 entitled "RTP: A transport protocol for real-time applications". One difference being that in RFC 1889, the value of n is fixed at 16.

In the case when the result is to be provided to the user in microseconds, the accuracy of the jitter and average jitter values are preferably higher than that (e.g., equal to the clock used by the hardware). When provided to the user, the jitter_average value is normalized accordingly.

Figure 8:
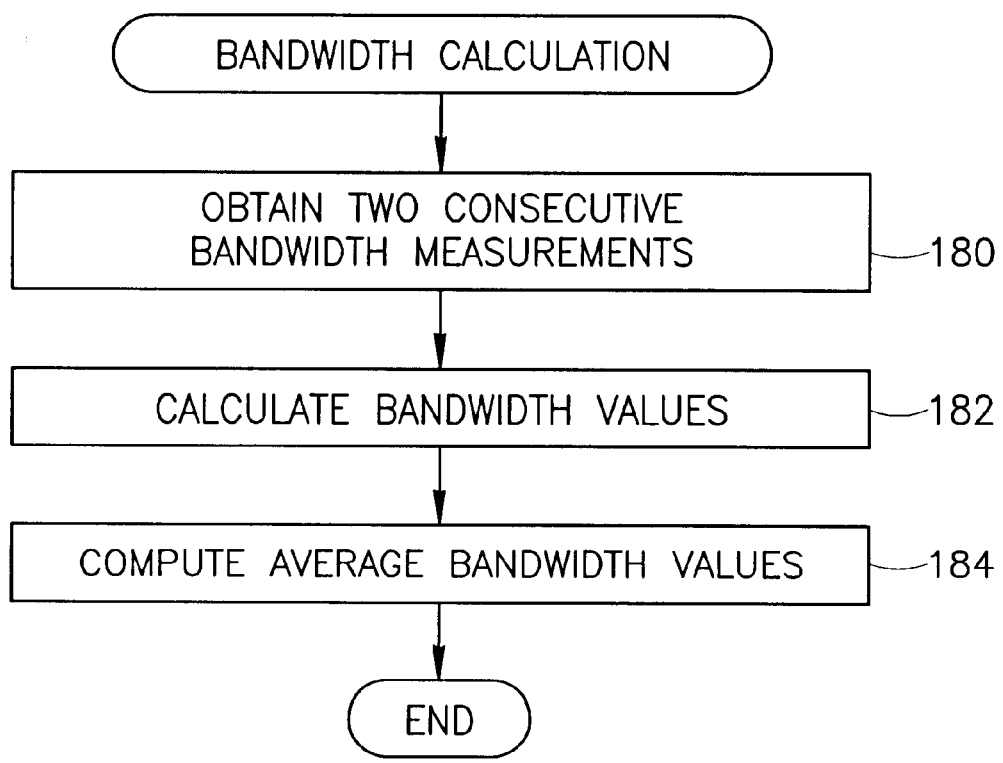
FIG. 8 is a flow diagram illustrating the bandwidth calculation method of the present invention.

The method of bandwidth calculation will now be described in more detail. A flow diagram illustrating the bandwidth calculation method of the present invention is shown in FIG. 8. First, two consecutive bandwidth value measurements are obtained (step 180). The bandwidth values (step 182) and average bandwidth values (step 184) are then calculated in accordance herewith. Bandwidth calculations are performed according to two consecutive measurements (e.g., two measurements made one second from each other). The bandwidth is calculated in accordance with the following.

$$\text{Sent\_octets} = client\_ingress\_frwd\_octets_2 - client\_ingress\_frwd\_octets_1 \quad (5)$$

$$\text{Sent\_marked\_octets} = client\_ingress\_frwd\_marked\_octets_2 - client\_ingress\_fwrd\_marked\_octets_1 \quad (6)$$

$$\text{remote\_rcvd\_octets} = remote\_egress\_fwrd\_octets_2 - remote\_egress\_fwrd\_octets_1 \quad (7)$$

$$\text{remote\_rcvd\_marked\_octets} = remote\_egress\_fwrd\_marked\_octets_2 - remote\_egress\_fwrd\_marked\_octets_1 \quad (8)$$

$$\text{lost\_octets} = sent\_octets - remote\_received\_octets \quad (9)$$

$$\text{lost\_marked\_octets} = sent\_marked\_octets - remote\_rcvd\_marked\_octets \quad (10)$$

The quantity client_ingress_fwrd_octets is the value of the ingress 'correctly forwarded octets' counter for the particular connection as measured by the ingress packet processor of the client access device when sending the request message. This counter counts the CIR compliant traffic octets of the specific connection forwarded by this device into the network.

The quantity client_ingress_frwd_marked_octets is the value of the ingress 'forwarded octets and marked' counter for the particular connection as measured by the ingress packet processor of the client access device when sending the request message. This counter counts the EIR compliant traffic (which is not CIR compliant) octets of the specific connection forwarded by this device into the network.

The quantity remote_egress_fwrd_octets is the value of the egress 'correctly forwarded octets' (received) counter for the particular connection as measured by the egress packet processor of the server access device when receiving the request message. This counter counts the CIR compliant traffic octets of the specific connection received by this device from the network.

The quantity remote_egress_fwrd_marked_octets is the value of the egress 'forwarded octets and marked' counter for the particular connection as measured by the egress packet processor of the server access device when receiving the request message. This counter counts the EIR compliant traffic (which is not CIR compliant) octets of the specific connection received by this device from the network.

The averages for the above values are maintained by the access device in the same manner as described above for the end-to-end delay (i.e. round trip delay) and jitter calculations.

To allow network management systems access to the SLA measurement process, several MIB items are defined. Two MIB items are maintained for each iterator. The first is the iteration-number which reflects the iteration number this iterator is currently performing.

The second is the last-connection-measured which is the number of the connection that was last measured by this iterator during the current iteration. These MIB items should preferably be updated (i.e. increased) only one second after the connection was measured for the second time in this iteration (i.e. they should reflect the connection that has completed its measurements in the former second). This MIB item serves for the NMS to know which connections should be read since they contain new information.

In case the reply message does not arrive for a certain query, the former query average and jitter should be used and exported to the MIB-items.

The access device is adapted to maintain a table for the configuration of one or more iterators. The table should have the following MIB items:

1. IteratorIndex: values 1.2 in this example embodiment.
2. AdminStatus: indicates whether this iterator is active or not.
3. IteratorInterval: the length of the iterator interval in seconds (16-bit field).
4. IteratorEnd: the number of iterations to be performed since setting the AdminStatus field to active. The value 0 indicates that this Iterator should operate indefinitely.
5. Iteration number: the number of the iteration that the iterator is currently performing.
6. LastConnectionMeasured: the connection last measured by this iterator. Always reflects the connection that was measured for the second time a second ago.

An additional table comprises two indices: IteratorIndex and ConnectionId which defines the operation for the specific connection with the specific iterator. The table is dynamic permitting entries to be inserted as required. The access device limits the number of connections per iterator according to the IteratorInterval.

1. IteratorIndex: values are 1 or 2 in this example embodiment.
2. ConnectionId: identifies the connection to be polled.
3. SlaMeasurementPacketLength: The length of the packet to be used. Minimum value is 128, maximum is 1522, default is 128.
4. AverageCalculationPeriod: the number of last iterations over which the average of the round-trip delay measured should be calculated (N between 1 and 1024 default is 1).
5. RoundTripDelayAverage: the average of round-trip delay over this connection as calculated by the access device. This value is preferably in milliseconds.
6. JitterCalculationPeriod: the number of previous iterations over which the average of the jitter measured is to be calculated (Nj between 1 and 1024 default is 1).
7. JitterAverage: the average jitter over this connection from the local side to the remote side as calculated by the access device. This value is preferably in milliseconds.
8. LastIterationStartTimestamp: the timestamp generated by the client access device ingress side upon sending the SLA measurement request message during the last iteration for this connection. Preferably in microseconds.
9. LastIterationReturnTimestamp: the timestamp generated by the client access device egress side upon receiving the SLA measurement response message in the last iteration for this connection. Preferably in microseconds.
10. LastIterationRemoteReceivedTimestamp: the timestamp generated by the server access device ingress side upon receiving the SLA measurement request in the last iteration for this connection. Preferably in microseconds.
11. FormerIterationStartTimestamp: the timestamp generated by the client access device ingress side upon sending the SLA measurement request message in the next to last iteration for this connection. Preferably in microseconds.
12. FormerIterationRetrunTimestamp: the timestamp generated by the client access device egress side upon receiving the SLA measurement response message in the next to last iteration for this connection. Preferably in microseconds.
13. FormerIterationRemoteReceivedTimestamp: the timestamp generated by the server access device ingress side upon receiving the SLA measurement request in the next to last iteration for this connection. Preferably in microseconds.
14. SentOctets: the number of CIR compliant octets sent in the last 1 second period checked.
15. SentMarkedOctets: the number of EIR compliant octets (that are not CIR compliant) sent in the last 1 second period checked.
16. LostOctets: the number of lost CIR compliant octets in the last 1 second period checked.
17. LostMarkedOctets: the number of lost EIR compliant octets (that are not CIR compliant) in the last 1 second period checked.

Additional MIB items are implemented on a per-connection basis for counting the packets of the SLA measurement protocol.

1. ClientSlaMeasurementProtocolSentPackets: the number of SLA measurement protocol packets sent by the client iterator task of this access device on the specific connection.
2. ClientSlaMeasurementProtocolSentOctets: the number of octets in the SLA measurement protocol packets sent by the client iterator task of this access device on the specific connection.
3. ClientSlaMeasurementProtocolReceivedPackets: the number of SLA measurement protocol packets received by the client iterator task of this access device on the specific connection.
4. ClientSlaMeasurementProtocolReceivedOctets: the number of octets in the SLA measurement protocol packets received by the client iterator task of this access device on the specific connection.
5. ServerSlaMeasurementProtocolPackets: the number of SLA measurement protocol packets received and returned by the packet processing engine of this access device on the specific connection by the local device while being polled by the remote side.
6. ServerSlaMeasurementProtocolOctets: the number of octets in the SLA measurement protocol packets received and returned by the packet processing engine of this access device on the specific connection by the local device while being polled by the remote side.

Several command line (CLI) commands are defined for initiating and stopping the SLA measurements process for specific connections. These commands can aid field technicians when attempting to debug specific connections. The following CLI commands can be implemented on the access device via the software.

1. Set iterator IteratorIndex AdminStatus IteratorInterval IteratorEnd
2. Add connection to iterator IteratorIndex ConnectionId SlaMeasurementPacketLength AverageCalculationPeriod
3. Remove connection from Iterator IteratorIndex ConnectionId
4. Show connection measurements IteratorIndex ConnectionId Operation of the mechanism of the present on multipoint to multipoint connections will now be described. When adding a multipoint to multipoint connection to one of the iterators in a specific access device, the access device sends an SLA measurement request message over the connection. All other members of the multipoint to multipoint connection receive this message and their packet processing engines immediately reply with an SLA measurement response message.

Each of the members of the multipoint to multipoint connection then receives the SLA measurement response message sent by the other members of the connection. To improve efficiency and provide scalability, only the CPU of the client access device that emitted the request processes all the replies. The client MAC address field in the SLA measurement protocol header is used to enable the hardware based packet processing engine to identify the appropriate replies.

When the client access device sends the SLA measurement request message, it sets the client MAC-address field to its own MAC address. Note that this is not the source address field in the MAC address header but a field inside the SLA measurements protocol header. The server sends the message back with this field unchanged. The packet processing engine of the client receives the response and forwards it to the CPU only if the client MAC-address field is equal to one of the MAC addresses of the access device or is a broadcast or multicast address. Otherwise, the packet is silently dropped. Thus, only the CPU of the client access device receives the responses.

In clock-rate synchronization messages, the software sets the client MAC address field to the broadcast MAC-address, indicating that the packet should be forwarded to the CPU of the receiving side in any case.

As already mentioned above, the client receives a number of response messages, one from each of the other participants in the multipoint to multipoint connection. It is desirable that the overall result reflects the largest delay among all the replies. This is achieved by processing all the replies and extracting the largest delay obtained. Note that the LastConnectionMeasured MIB item is increased to reflect a connection only one second later for that connection, there thus being no danger that the NMS will receive an intermediate result.

When measuring a multipoint to multipoint connection, the client does not send SLA measurement clock-rate request messages, and thus does not attempt to calculate jitter values but only end-to-end delay. This is due to the possibility that the devices at the remote sides of the connection may have different clocks and the implementation has only has a single remote-clock value.

In an alternative embodiment of the present invention, the switches that make up the core network or MAN may be adapted to implement the mechanism and protocol of the present invention and thus serve as an access device, i.e. it has one or more user ports. In this case, the same protocol is implemented wherein a user can activate the protocol on each connection that begins in a user-edge port that is local to the switch. All functions and activities described above as performed by the software of the access device are also performed by the software of the switch. All functions and activities described above as performed by the packet processing engine of the access device are performed by the hardware in the core switch.

One possible implementation for the core switch hardware is to use network-processors interconnected by a switch fabric. In this embodiment, the network-processor in the specific user edge port in which the connection originates is required to perform the relevant packet processing tasks. The client software in the switch sends the packet to the network-processor of the specific user edge port. The user edge port receives this packet on its egress side (since it came from the CPU) but stamps it with ingress side counters and forwards it to the fabric along the connection that is being tested. When received by the same network-processor, the packet is time stamped and forwarded to the software.

The server side function is also performed by the network-processor of the user edge port of the connection. In this case, the network processor receives the packet from the fabric, timestamps it and returns it to the fabric.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method in a network for performing service level agreement (SLA) measurements on one or more connections, said method comprising the steps of:

generating at a local device a local ingress stamp and transmitting an SLA measurement request message incorporating said local ingress stamp over the connection to a remote device;

generating a remote egress stamp at said remote device and transmitting an SLA measurement response message incorporating acid remote egress stamp and said local ingress stamp over, the connection to said local device;

generating a local egress stamp upon receipt by said local device of said SLA measurement response message; and calculating one or more SLA parameter measurements in accordance with said local ingress stamp, said remote egress stamp and said local egress stamp.

2. The method according to claim 1, wherein said SLA measurement request message comprises a first corresponding destination media access control (MAC) address.

3. The method according to claim 1, wherein said SLA measurement request message comprises a first corresponding destination Internet Protocol (IP) address.

4. The method according to claim 1, wherein said SLA measurement request message comprises a first corresponding destination multicast Internet Protocol (IP) address.

5. The method according to claim 1, wherein said SLA measurement response message comprises a second corresponding destination media access control (MAC) address.

6. The method according to claim 1, wherein said SLA measurement response message comprises a second corresponding destination Internet Protocol (IP) address.

7. The method according to claim 1, wherein said SLA measurement response message comprises a second corresponding destination multicast Internet Protocol (IP) address.

8. The method according to claim 1, further comprising the step at said remote device of inserting a source media access control (MAC) address corresponding to said remote device in said SLA measurement response message.

9. The method according to claim 1, further comprising the step of setting different measurement cycle periods for each individual connection.

10. The method according to claim 1, wherein said SLA measurement method is performed per connection on a periodic basis.

11. The method according to claim 1, further comprising the step of setting different measurement cycles for said plurality of connections wherein said measurement cycles do not occur simultaneously.

12. The method according to claim 1, wherein said step of generating a remote egress stamp at said remote device is performed utilizing hardware alone without the need for processing by upper software layers of said remote device.

13. The method according to claim 1, wherein said step of generating a remote egress stamp and transmitting a message incorporating this stamp at said remote device is performed utilizing hardware alone without the need for processing by a Central Processing Unit (CPU) of said remote device.

14. The method according to claim 1, wherein said SLA measurement method comprises a plurality of fixed measurement cycles wherein each connection is registered to at least one fixed measurement cycle.

15. The method according to claim 1, wherein two consecutive SLA measurements are performed for each connection.

16. The method according to claim 15, wherein said two consecutive SLA measurements are performed within substantially one second of each other.

17. The method according to claim 1, wherein transmission and receipt of SLA measurement request messages and of SLA measurement response messages occur asynchronously to each other.

18. The method according to claim 1, wherein said one or more SLA parameter measurements comprises a measurement of round trip delay.

19. The method according to claim 1, wherein said one or more SLA parameter measurements comprises a measurement of jitter.

20. The method according to claim 1, wherein said one or more SLA parameter measurements comprises a measurement of bandwidth value.

21. The method according to claim 1, wherein said steps of generating a local ingress stamp, remote egress stamp and local egress stamp and the step of transmitting said SLA measurement response message are implemented in an Application Specific Integrated Circuit (ASIC).

22. The method according to claim 1, wherein said steps of generating a local ingress timestamp, remote egress timestamp and local egress timestamp and the step of transmitting said SLA measurement response message are implemented in a Field Programmable Gate Array (FPGA).

23. The method according to claim 1, wherein said steps of generating a local ingress timestamp, remote egress timestamp and local egress timestamp and the step of transmitting said SLA measurement response message are implemented in a network processor.

24. A method in a network device for performing service level agreement (SLA) measurements on one or more connections, said method comprising the steps of:
  generating a client ingress stamp and transmitting an SLA measurement request message incorporating said local ingress stamp over a communications network to a remote device for generating a server egress stamp and responding therewith;
  receiving an SLA measurement response message incorporating said server egress stamp and generating a client egress stamp in response thereto; and
  calculating one or more SLA parameter measurements in accordance with said client ingress stamp, said server egress stamp and said client egress stamp.

25. The method according to claim 24 wherein said SLA measurement request message comprises a first corresponding destination media access control (MAC) address.

26. The method according to claim 24, wherein said SLA measurement request message comprises a first corresponding destination Internet Protocol (IP) address.

27. The method according to claim 24, wherein said SLA measurement request message comprises a first corresponding destination multicast Internet Protocol (IP) address.

28. The method according to claim 24, wherein said SLA measurement response message comprises a second corresponding destination media access control (MAC) address.

29. The method according to claim 24, wherein said SLA measurement response message comprises a second corresponding destination Internet Protocol (IP) address.

30. The method according to clam 24, wherein said SLA measurement response message comprises a second corresponding destination multicast Internet Protocol (IP) address.

31. The method according to claim 24, further comprising the step at said remote device of inserting a source media access control (MAC) address corresponding to said remote device in said SLA measurement response message.

32. The method according to claim 24, wherein said SLA measurement method is performed per connection on a periodic basis.

33. The method according to claim 24, wherein a message incorporating said remote egress stamp is generated and transmitted utilizing hardware without the need for processing by upper software layers of said remote device.

34. The method according to claim 24, wherein a message incorporating said remote egress stamp is generated and transmitted utilizing hardware alone without the need for processing by a Central Processing Unit (CPU) in said remote device.

35. The method according to claim 24, wherein sad SLA measurement method comprises a plurality of fixed measurement cycles wherein each connection is registered to at least one fixed measurement cycle.

36. The method according to claim 24, wherein said one or more SLA parameter measurements comprises a measurement of round trip delay.

37. The method according to claim 24, wherein said one or more SLA parameter measurements comprises a measurement of jitter.

38. The method according to claim 24, wherein said one or more SLA parameter measurements comprises a measurement of bandwidth values.

39. The method according to claim 24, wherein said steps of generating a client ingress stamp and client egress stamp are implemented in an Application Specific Integrated Circuit (ASIC).

40. The method according to claim 24, wherein said steps of generating a client ingress stamp and client egress stamp are implemented in a Field Programmable Gate Array (FPGA).

41. The method according to claim 24, wherein said steps of generating a client ingress stamp and client egress stamp are implemented in a network processor.

42. A method in a network device for performing service level agreement (SLA) measurements on one or more connections, said method comprising the steps of:
  receiving an SLA measurement request message incorporating a client ingress stamp from a client device over a communications network; and
  generating a server egress stamp and transmitting an SLA measurement response message incorporating said remote egress stamp and said client ingress stamp over said communications network to said client device for generating a client egress stamp and calculating one or more SLA parameter measurements in accordance with said client ingress stamp, said server egress stamp and said client egress stamp.

43. The method according to claim 42 wherein said SLA measurement request message comprises a first corresponding destination media access control (MAC) address.

44. The method according to claim 42, wherein said SLA measurement request message comprises a first corresponding destination Internet Protocol (IP) address.

45. The method according to claim 42, wherein said SLA measurement request message comprises a first corresponding destination multicast Internet Protocol (IP) address.

46. The method according to claim 42, wherein said SLA measurement response message comprises a second corresponding destination media access control (MAC) address.

47. The method according to claim 42, wherein said SLA measurement response message comprises a second corresponding destination Internet Protocol (IP) address.

48. The method according to claim 42, wherein said SLA measurement response message comprises a second corresponding destination multicast Internet Protocol (IP) address.

49. The method according to claim 42, further comprising the step at said network device of inserting a source media access control (MAC) address corresponding to said remote device in said SLA measurement response message.

50. The method according to claim 42, wherein said remote egress stamp is generated at said remote device utilizing hardware without the need for processing by upper software layers of said remote device.

51. The method according to claim 42, wherein said remote egress stamp is generated utilizing hardware alone without the need for processing by a Central Processing Unit (CPU) in said remote device.

52. The method according to claim 42, wherein said one or more SLA parameter measurements comprises a measurement of round trip delay.

53. The method according to claim 42, wherein said one or more SLA parameter measurements comprises a measurement of jitter.

54. The method according to claim 42, wherein said one or more SLA parameter measurements comprises a measurement of bandwidth characteristics.

55. The method according to claim 42, wherein said step of generating a server egress stamp and transmitting said SLA measurement response message are implemented in an Application Specific Integrated Circuit (ASIC).

56. The method according to claim 42, wherein said step of generating a server egress stamp and transmitting said SLA measurement response message are implemented in a Field Programmable Gate Array (FPGA).

57. The method according to claim 42, wherein said steps of generating a server egress stamp and transmitting said SLA measurement response message are is implemented in a network processor.

58. A network device, comprising:
a control processor;
one or more user ports;
one or more network ports;
ingress packet processing means adapted to recognize service level agreement (SLA) measurement request messages generated for connections and to generate client ingress stamps in response thereto;
transmission means adapted to transmit said SLA measurement request messages over a communications network to a remote device at a far end of the connection for replying with a server egress stamp within an SLA measurement response message;
egress packet processing means adapted to recognize said SLA measurement response message and to generate a client egress stamp;
means for forwarding said client ingress stamp, server egress stamp, said client egress stamp, connection-ID and iterator to said control processor; and
software operative on said control processor for calculating one or more SLA measurement parameters in accordance with said client ingress stamp, server egress stamp and said client egress stamp.

59. The device according to claim 58, wherein said SLA measurement request message comprises a first corresponding destination media access control (MAC) address.

60. The device according to claim 58, wherein said SLA measurement request message comprises a first corresponding destination Internet Protocol (IP) address.

61. The device according to claim 58, wherein said SLA measurement request message comprises a first corresponding destination multicast Internet Protocol (IP) address.

62. The device according to claim 58, wherein said SLA measurement response message comprises a second corresponding destination media access control (MAC) address.

63. The device according to claim 58, wherein said SLA measurement response message comprises a second corresponding destination Internet Protocol (IP) address.

64. The device according to claim 58, wherein said SLA measurement response message comprises a second corresponding destination multicast Internet Protocol (IP) address.

65. The device according to claim 58, wherein said SLA measurement method comprises a plurality of fixed measurement cycles wherein each connection is registered to at least one fixed measurement cycle.

66. The device according to claim 58, wherein said one or more SLA parameter measurements comprises a measurement of round trip delay.

67. The device according to claim 58, wherein said one or more SLA parameter measurements comprises a measurement of jitter.

68. The device according to claim 58, wherein said one or more SLA parameter measurements comprises a measurement of bandwidth characteristics.

69. A protocol for use in performing service level agreement (SLA) measurements in a network, comprising messages wherein each message comprises:
a first field in an SLA measurement message representing a particular connection to be measured;
a second field in an SLA measurement message representing a client ingress stamp;
a third field in an SLA measurement message representing a server egress stamp; and
a fourth field in an SLA measurement message representing a client egress stamp.

70. A computer program product for use in a network device, said computer program product comprising:
a computer useable medium having computer readable program code means embodied in said medium for performing service level agreement (SLA) measurements on one or more connections, said computer program product comprising:
computer readable program code means for generating, for each connection to be measured, a client ingress stamp and transmitting an SLA measurement request message incorporating said local ingress stamp over a communications network to a remote device for responding with an server egress stamp;

computer readable program code means for receiving an SLA measurement response message incorporating said server egress stamp and generating a client egress stamp in response thereto; and computer readable program code means for calculating one or more SLA parameter measurements in accordance with said client ingress stamp, said server egress stamp and said client egress stamp.

* * * * *

UNITED STATES PATENT AND TRADEMARK OFFICE
CERTIFICATE OF CORRECTION

PATENT NO. : 6,643,612 B1
DATED : November 4, 2003
INVENTOR(S) : Lahat el al.

It is certified that error appears in the above-identified patent and that said Letters Patent is hereby corrected as shown below:

Title page,
Item [*] Notice, insert -- Subject to any disclaimer the term of this patent is extended or adjusted under 35 USC 154(b) by 128 days. --

Signed and Sealed this

Fifth Day of October, 2004

JON W. DUDAS
*Director of the United States Patent and Trademark Office*